(12) United States Patent
    Pokharel

(10) Patent No.: US 10,728,190 B2
(45) Date of Patent: Jul. 28, 2020

(54) FORM BASED USER INTERACTIONS VIA MESSAGING CHANNELS

(71) Applicant: salesforce.com, inc., San Francisco, CA (US)

(72) Inventor: Anurodh Pokharel, Bookline, MA (US)

(73) Assignee: salesforce.com, inc., San Francisco, CA (US)

( * ) Notice: Subject to any disclaimer, the term of this patent is extended or adjusted under 35 U.S.C. 154(b) by 152 days.

(21) Appl. No.: 16/002,982

(22) Filed: Jun. 7, 2018

(65) Prior Publication Data

US 2019/0007353 A1     Jan. 3, 2019

Related U.S. Application Data

(60) Provisional application No. 62/526,840, filed on Jun. 29, 2017.

(51) Int. Cl.
| | |
|---|---|
| *G06F 15/16* | (2006.01) |
| *H04L 12/58* | (2006.01) |
| *H04L 29/08* | (2006.01) |
| *G06F 16/2457* | (2019.01) |
| *G06F 40/174* | (2020.01) |

(52) U.S. Cl.
CPC ...... *H04L 51/046* (2013.01); *G06F 16/24573* (2019.01); *H04L 51/04* (2013.01); *H04L 51/32* (2013.01); *H04L 67/141* (2013.01); *H04L 67/306* (2013.01); *G06F 40/174* (2020.01); *H04L 51/36* (2013.01)

(58) Field of Classification Search
CPC ....... H04L 51/046; H04L 51/04; H04L 51/32; H04L 67/306; G06F 16/24573; G06F 40/174
See application file for complete search history.

(56) References Cited

U.S. PATENT DOCUMENTS

| | | | | |
|---|---|---|---|---|
| 7,162,526 | B2 * | 1/2007 | Dutta | H04L 29/06 704/270 |
| 2004/0225753 | A1 * | 11/2004 | Marriott | H04L 51/36 709/246 |
| 2005/0068980 | A1 * | 3/2005 | Mathew | G06Q 10/06 370/464 |
| 2006/0291471 | A1 * | 12/2006 | Heuer | H04L 51/28 370/395.5 |
| 2007/0043878 | A1 * | 2/2007 | Carlson | H04L 51/066 709/246 |

(Continued)

*Primary Examiner* — Razu A Miah
(74) *Attorney, Agent, or Firm* — Fenwick & West LLP

(57) ABSTRACT

A channel independent metadata representation of forms is stored by an online system that interacts with client devices via a plurality of messaging channels. The online system allows use of forms by various messaging channels. The online system receives a request identifying a form and a messaging channel. The online system retrieves a channel independent metadata representation of the selected form. The online system generates a channel specific representation of the selected form for the identified messaging channel from the metadata representation. The generated form representation is sent by the online system to the client device via the messaging channel. The client device may render a user interface comprising the form.

20 Claims, 6 Drawing Sheets

(56) References Cited

U.S. PATENT DOCUMENTS

| | | | | |
|---|---|---|---|---|
| 2009/0240564 A1* | 9/2009 | Boerries | G06Q 30/02 | 709/204 |
| 2009/0248415 A1* | 10/2009 | Jablokov | G10L 15/30 | 704/251 |
| 2010/0057854 A1* | 3/2010 | Chinnam | G06Q 10/10 | 709/206 |
| 2010/0125567 A1* | 5/2010 | Morris | G06F 16/907 | 707/722 |
| 2010/0281152 A1* | 11/2010 | Istavan | H04L 67/2823 | 709/223 |
| 2011/0010460 A1* | 1/2011 | Lavoie | G06Q 40/04 | 709/231 |
| 2011/0078129 A1* | 3/2011 | Chunilal | G06Q 10/00 | 707/706 |
| 2011/0276396 A1* | 11/2011 | Rathod | H04L 12/18 | 705/14.49 |
| 2012/0023055 A1* | 1/2012 | Dagaeff | H04N 21/235 | 706/47 |
| 2014/0101261 A1* | 4/2014 | Wu | G06Q 10/107 | 709/206 |
| 2014/0101262 A1* | 4/2014 | Wu | H04L 51/046 | 709/206 |
| 2014/0101263 A1* | 4/2014 | Wu | H04L 51/18 | 709/206 |
| 2014/0129639 A1* | 5/2014 | Burge | H04L 51/32 | 709/204 |
| 2014/0380145 A1* | 12/2014 | Wilsher | H04L 12/287 | 715/234 |
| 2015/0234803 A1* | 8/2015 | Collart | G06F 9/451 | 715/745 |
| 2015/0277688 A1* | 10/2015 | Behar | G06F 1/162 | 715/744 |
| 2015/0317339 A1* | 11/2015 | Vranyes | G06Q 10/00 | 707/695 |
| 2016/0072741 A1* | 3/2016 | Hamilton | H04L 67/22 | 709/206 |
| 2016/0286526 A1* | 9/2016 | Shirazi | H04M 15/61 | |

* cited by examiner

400

View Rates 
Our best rate. Guaranteed.

Guest Rooms

Guest Room - 479 USD /night
1 King or 2 Double

River View room - 518 USD /night
Guest room, 1 King or 2 Double, Charles River view

Club level - 528 USD /night
Guest room, 1 King or 2 Double

Executive Suite - 600

450

US 10,728,190 B2

FORM BASED USER INTERACTIONS VIA MESSAGING CHANNELS

CROSS-REFERENCE TO RELATED APPLICATION(S)

This application claims the benefit of U.S. Provisional Application No. 62/526,840, filed Jun. 29, 2017, which is incorporated by reference in its entirety.

BACKGROUND

Messaging channels are used as a means of communication between devices of users, for example, mobile phones, tablets, or laptops. A messaging channel typically comprises a messaging application that executes on a client device and uses communication mechanisms that may involve an online system. Examples of messaging applications include over the top (OTT) messaging applications like APPLE BUSINESS CHAT and FACEBOOK MESSENGER are becoming increasingly complex. An OTT service refers to a service you use over the network services of your service provider. Each messaging channel may use a different protocol/code/format. For example, different messaging channels provided by different vendors typically use different protocols/codes/formats.

Conventional messaging applications associated with messaging channels do not support use of forms. Forms allow for interactivity similar to the World Wide Web. However, conventional messaging applications use a text-based interface (e.g., type YES to proceed, NO to stop, etc.). Such interface may be adequate for very simple user interactions that require simple questions/answers but becomes cumbersome with complex user interactions, for example, if the user needs to provide data for several input fields or if the user needs to make a choice between a large number of elements. Conventional messaging applications do not support forms because supporting forms typically requires user interface development associated with different messaging applications and messaging channels. Since each messaging application uses a different protocol/code/format developers are often unable to keep up with changes in messaging applications. As a result, conventional messaging channels often provide poor user experience for users communicating using the messaging channels.

The figures depict various embodiments for purposes of illustration only. One skilled in the art will readily recognize from the following discussion that alternative embodiments of the structures and methods illustrated herein may be employed without departing from the principles described herein.

DESCRIPTION OF PREFERRED EMBODIMENTS

Overview

Embodiments relate to a method for abstracting structured content and forms on a messaging channel, for example, messaging channel based on OTT message providers. An online system stores channel independent metadata representation of each of a plurality of forms. The online system is configured to interact with client devices via a plurality of messaging channels. The client devices interact with the online system using a plurality of different messaging channels. Each messaging channel interacts with the online system via a different messaging application executing on a client device.

The following steps are repeated for each of a plurality of client devices. The online system receives a request for a session from the client device via a messaging channel, the request identifying the messaging channel. The online system receives a selection of a form from the plurality of forms. A channel independent metadata representation of the selected forms is retrieved by the online system. The online system generates a representation of the selected form for the identified messaging channel using the metadata representation of the selected form. The generated representation conforms to a format processed by the identified messaging channel. The generated form representation is sent by the online system to the client device via the messaging channel. The generated representation of the selected form provides data allowing the client device to render a user interface of the messaging channel, the user interface comprising the selected form.

The method of the present disclosure is an improvement in the technical field of user interfaces (UI) since conventional messaging applications are unable to display forms. In this context, a form represents an interface that comprises fields that allow users to enter data. The method allows messaging applications to display forms as graphical user interfaces consistently across multiple messaging channels.

More specifically, the method defines forms in a channel independent format instead of each messaging channel's format. The forms are compiled into formats corresponding to each messaging channel's format at a gateway that interfaces directly with a messaging channel Provider. As a result, developers do not have to develop and maintain a form for each messaging channel that support is added for.

Overall System Environment

Figure 1:
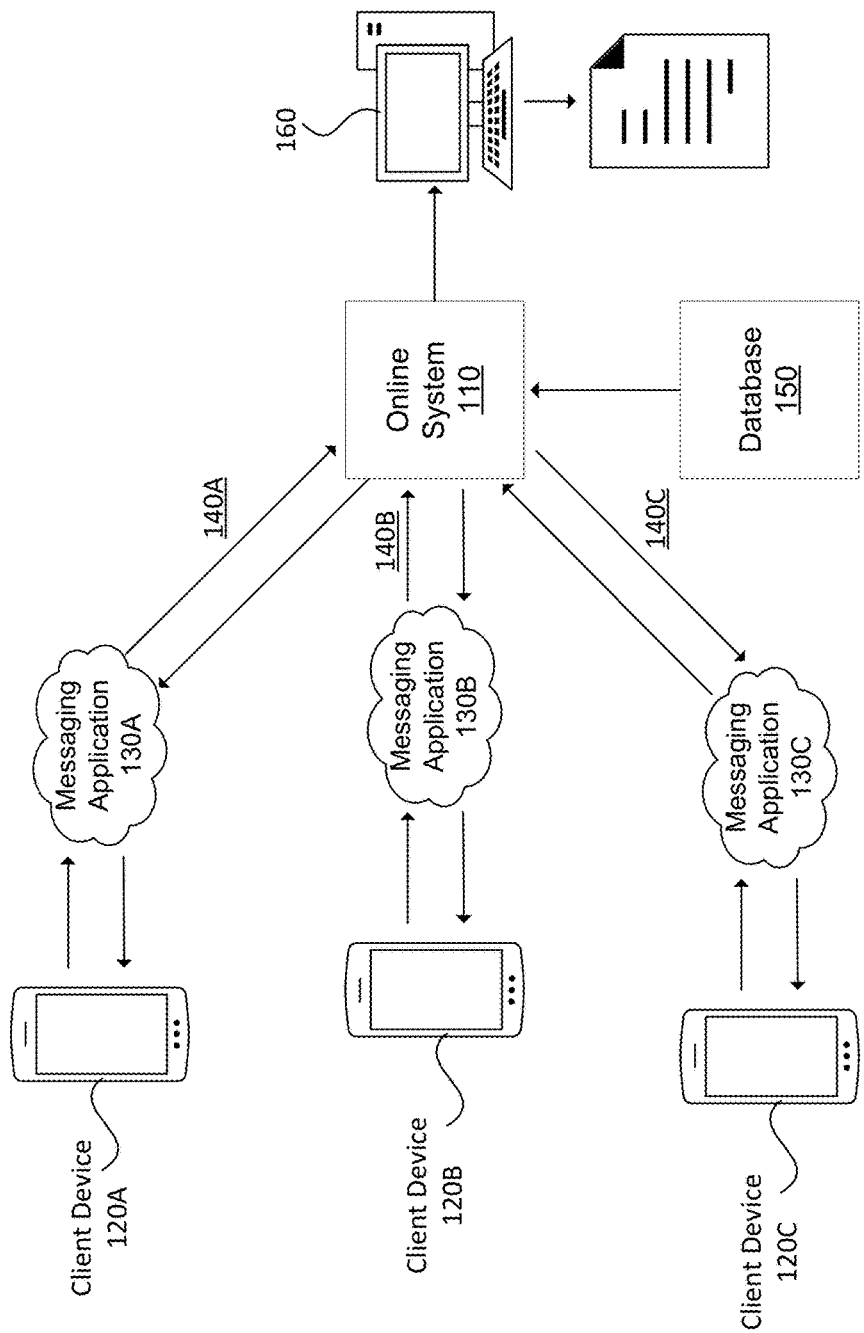
FIG. 1 is block diagram of a system environment in which an online system operates, in accordance with an embodiment.

FIG. 1 is block diagram of a system environment 100 in which an online system operates, in accordance with an embodiment. In addition to the online system, the system environment 100 shown by FIG. 1 includes, among other components, one or more client devices 120, one or more messaging applications 130, one or more messaging channels 140, a database 150, and a second client device 160. In alternative configurations, different and/or additional components may be included in the system environment 100.

The online system 110 stores a channel independent metadata representation of each of a plurality of forms and interacts with a client devices 120 via a plurality of messaging channels 140, each messaging channel 140 interacting with the online system 110 via a different messaging application 130 executing on a client device 120. A form represents an interface that comprises fields that allow users to enter data. For example, a form may allow users to enter their name, age, address, and other information. The form may display data, for example, data associated with each field. A form may allow a user to select one or more options from a plurality of given values. Typically a user interface uses various widgets to present form data and to receive input from users, for example, text fields, drop down list, submit button, radio button for selecting one of a plurality of values, and so on.

In some embodiments, the channel independent metadata representation of a form specifies a database query. The online system 110 executes the database query to retrieve a set of results and generates a representation of the form based on the result of the database query. The generated form representation may include a widget presenting data returned by the database query. For example, the generated form may present a table describing the results of the database query, thereby allowing the user to make a decision based on the presented data before providing further input. As another example, the generated form may include a drop down list based on the database query results, thereby allowing the user to select one or more values from the drop down list.

The client devices 120 are one or more computing devices capable of receiving user input as well as transmitting and/or receiving data via the messaging channels. In one embodiment, a client device 120 is a conventional computer system, such as a desktop or a laptop computer. Alternatively, a client device 120 may be a device having computer functionality, such as a personal digital assistant (PDA), a mobile telephone, a smartphone, or another suitable device. A client device 120 is configured to communicate via the messaging channels 140. In one embodiment, a client device 120 executes an application (e.g., messaging application 130A, 130B, 130C) allowing a user of the client device 120 to interact with the online system 110. For example, a client device 120 executes an over the top (OTT) messaging application 130 such as APPLE BUSINESS CHAT or FACEBOOK MESSENGER to enable interaction between a client device of the one or more client devices 120 and the second client device 160 via the messaging channels 140. In another embodiment, a client device 120 interacts with the online system 110 through an application programming interface (API) running on a native operating system of the client device 120, such as IOS® or ANDROID™.

The client devices 120 are configured to interact with the online system 110 via the plurality of different messaging channels 140, which may comprise any combination of local area and/or wide area networks, using both wired and/or wireless communication systems. In one embodiment, the messaging channels 140 use standard communications technologies and/or protocols. For example, the messaging channels 140 include communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the messaging channels include multiprotocol label switching (MPLS), transmission control protocol/Internet protocol (TCP/IP), hypertext transport protocol (HTTP), simple mail transfer protocol (SMTP), and file transfer protocol (FTP). The messaging channels 140 may be bi-directional, which allows for communication in both directions. Each messaging channel 140 may include a messaging application executing on a client device 120, wherein the messaging channel 140 interacts with the online system using a messaging protocol. Data exchanged over the messaging channels 140 may be represented using any suitable format, such as hypertext markup language (HTML) or extensible markup language (XML). In some embodiments, data exchanged over the messaging channels 140 is represented in JavaScript object notation (JSON). In some embodiments, all or some of the communication links of the messaging channels 140 may be encrypted using any suitable technique or techniques. The second client device 160 and its operation are substantially similar to a client device 120.

The online system 110 receives a request for a session from a client device 120 via a messaging channel 140. The request identifies the messaging channel 140. The online system 110 receives a selection of a first form from the plurality of forms and a channel independent metadata of the first form. The online system 110 generates a representation of the first form for the first messaging channel 140 from the metadata representation of the first form. The generated representation conforms to a format processed by the first messaging channel 140. For example, the generated representation of the first form may conform to an XML, format. The online system 110 sends the generated first form representation to the first client device 120 via the messaging channel 140. The first client device 120 renders a user interface of the first messaging channel 140 and the user interface includes the first form. Example user interfaces are described below with reference to FIGS. 4A-4B in detail.

In some embodiments, the first client device 120 receives a first user interaction with a widget of the first form representation. The online system 110 identifies a second form based on the user interaction. For example, a user interacts with a widget of a first form representation by making a selection for a date and the online system 110 identifies a second form which displays a list of available guest rooms based on selected date. The online system 110 selects a channel independent metadata representation of the second form and generates a second form representation of the second form for the first messaging channel 140 from the metadata representation of the second form. The online system 110 sends the generated second form representation to the first client device 120 via the first messaging channel 140. The first client device 120 renders a user interface of the first messaging channel 140 and the user interface includes the second form.

In some embodiments, the selection of the form is received from the second client device 160 that requests the online system 110 to push the selected form to the first client device 120 via the first messaging channel 140. For example, a customer support agent or an automatic agent sends a form to a client device 120.

Responsive to receiving the user interaction associated with a widget of a form, a log identifying the form and a metadata tag in the channel independent metadata representation is stored by the online system 110, the metadata tag corresponding to the widget. The channel independent representation allows for logging in a standardized manner. Generating a report describing user interactions includes receiving a criteria for generating the report, selecting a plurality of past user interactions from the logs wherein the selected user interactions satisfy the criteria, the selected user interactions comprising user interactions performed using a plurality of different messaging channels, and generating the report based on the past user interactions.

Figure 2:
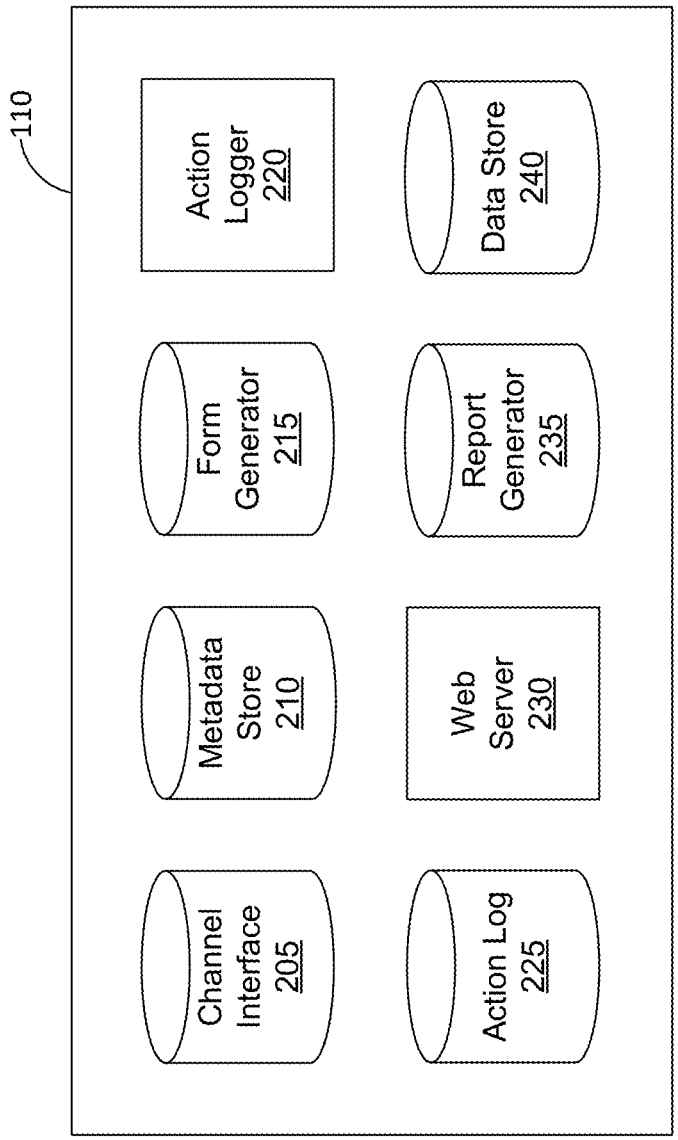
FIG. 2 is a block diagram of an online system, in accordance with an embodiment.

FIG. 2 is a block diagram 200 of an online system, in accordance with an embodiment. The online system stores a channel independent metadata representation of each of a plurality of forms and interacts with a client devices 120 via a plurality of messaging channels 140, each messaging channel 140 interacting with the online system 110 via a different messaging application 130 executing on a client device 120, as described above with reference to FIG. 1. The online system includes, among other components, a channel interface module 205, a metadata store 210, a form generator 215, an action logger 220, an action log 225, a web server 230, a data store 240, and a report generator 235.

The channel interface 205 allows for communication with different messaging channels. For example, in the embodiment of FIG. 1, the channel interface 205 allows the online system 110 to communicate with the client devices 120 via the messaging channels 140. The different messaging channels 140 may include OTT messaging applications such as APPLE BUSINESS CHAT and FACEBOOK MESSENGER.

The metadata store 210 stores the messaging channel independent representations of the forms. The form may be stored using a data structure that is capable of representing attributes and nested structures. In an embodiment, a form is stored using an XML (extended markup language) representation. In another embodiment, a form is stored using an object representation such as JSON (JavaScript Object Notation) representation. In some embodiments, the channel independent metadata representation of a form includes a database query, as described above with reference to FIG. 1. The form representation stores information identifying various widgets displayed in the form and various data values that need to be displayed in the form. Examples of widgets displayed in a form include buttons (e.g., a submit button), various fields, for example text field, labels, and so on. In some embodiments, the form representation includes tags that are messaging channel specific to support features that may be provided in one messaging channel but not others.

The form generator 215 may receive a plurality of inputs including: (1) a messaging channel identifier, and (2) a form identifier. For example, a customer relationship representative may identify a form for sending to a user via a messaging channel. Alternatively, a user may provide input via a messaging channel that causes a form to be displayed via the client device of the user. The form generator 215 retrieves the messaging channel independent representation of the input form from the metadata store 210 and generates a channel specific representation of the form for the messaging channel. For example, if the form generator 215 receives an input identifying a FACEBOOK MESSENGER channel and a form, the form generator 215 generates a representation of the form specific to the FACEBOOK MESSENGER channel. The generated representation of the form may conform to a markup language document, for example, an HTML (hypertext markup language) or an XML format. The form generator 215 includes instructions for generating channel specific form elements from channel independent description of the form. If a new messaging channel needs to be supported by the form generator, the form generator instructions are modified to generate form elements for the new messaging channel, however the form descriptions do not need to be modified.

In some embodiments, the form generator 215 generates a representation based on the result of a database query. Accordingly, the form representation may specify one or more database queries. The form generator 215 executes the database query against a database for example, data store 240. The data store 240 may be a database that stores records relevant to forms. The data store 240 may store information describing certain business and the form generator 215 generates forms associated with the business based on records obtained from the data store 240. For example, the data store 240 may store information describing various hotels including their location, ratings, types of rooms available, and so on. The form generator 215 may execute a database query to identify types of hotels that a user may be requested in based on criteria provided by the user. The form generator 215 generates a form comprising a table showing various hotels selected based on a database query and shows it to the user. The generated form may include one or more widgets, for example, checkboxes that allow a user to select one or more hotels and a submit button for submitting a request for making a reservation for hotel rooms.

The action logger 220 receives communications about user actions internal to and/or external to the online system, populating the action log 225 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 225.

The action log 225 may be used by the online system to track user actions on the online system. Users may interact with various objects on the online system, and information describing these interactions is stored in the action log 225. Examples of interactions with objects include: user interaction associated with a widget of a form and any other suitable interaction. Additionally, the action log 225 may record a user's interactions with a widget of a form on the online system as well as with other applications operating on the online system.

The web server 230 links the online system 110 via the messaging channels to the one or more client devices. The web server 230 serves web pages, as well as other content, such as JAVA®, FLASH®, XML and so forth. The web server 230 may receive and route messaging data between the online system 110 and the client device, for example, forms, instant messages, queued messages (e.g., email), text messages, short message service (SMS) messages, or messages sent using any other suitable messaging technique. Additionally, the web server 230 may provide application programming interface (API) functionality to send data directly to native client device operating systems, such as IOS®, ANDROID™, or BlackberryOS.

The report generator 235 generates reports based on past user interactions with a form. In some embodiments, a report specifies user interactions across multiple messaging channels. For example, a report specifies user interactions with forms across APPLE BUSINESS CHAT and FACEBOOK MESSENGER messaging channels. In an embodiment, the action log stores logs identifying the form and a metadata tag in the channel independent metadata representation responsive to receiving a user interaction associated with a widget of a form. The metadata tag corresponds to the widget of the form that the user interacted with. For example, if the user clicks on a submit button of a form representing a user profile information, the action log stores information identifying the user profile form and the submit button of the form. The ability to store forms in a channel independent representation allows the action logs to store user interaction information in a standardized manner. For example, two messaging channels may represent the same form very differently and refer to the same widget using different identifiers. However the action logger logs the user interaction using the channel independent representations of the forms thereby allowing the report generator 235 to generate consistent reports describing user interactions of certain types. For example, the report generator 235 may generate a report based on all user interactions with a form of a certain type independent of the messaging channel used for performing the user interactions or the report generator 235 may generate a report based on all user interactions with a particular widget of a form of a certain type independent of the messaging channel used for performing the user interactions. Without using the channel independent representations of the forms, the report definitions specified for generating reports would be very cumbersome and will also break if a messaging channel made changes to representations of the form (by renaming the form or the widgets of the form) or if a new messaging channel was added or an existing messaging channel removed.

Figure 3:
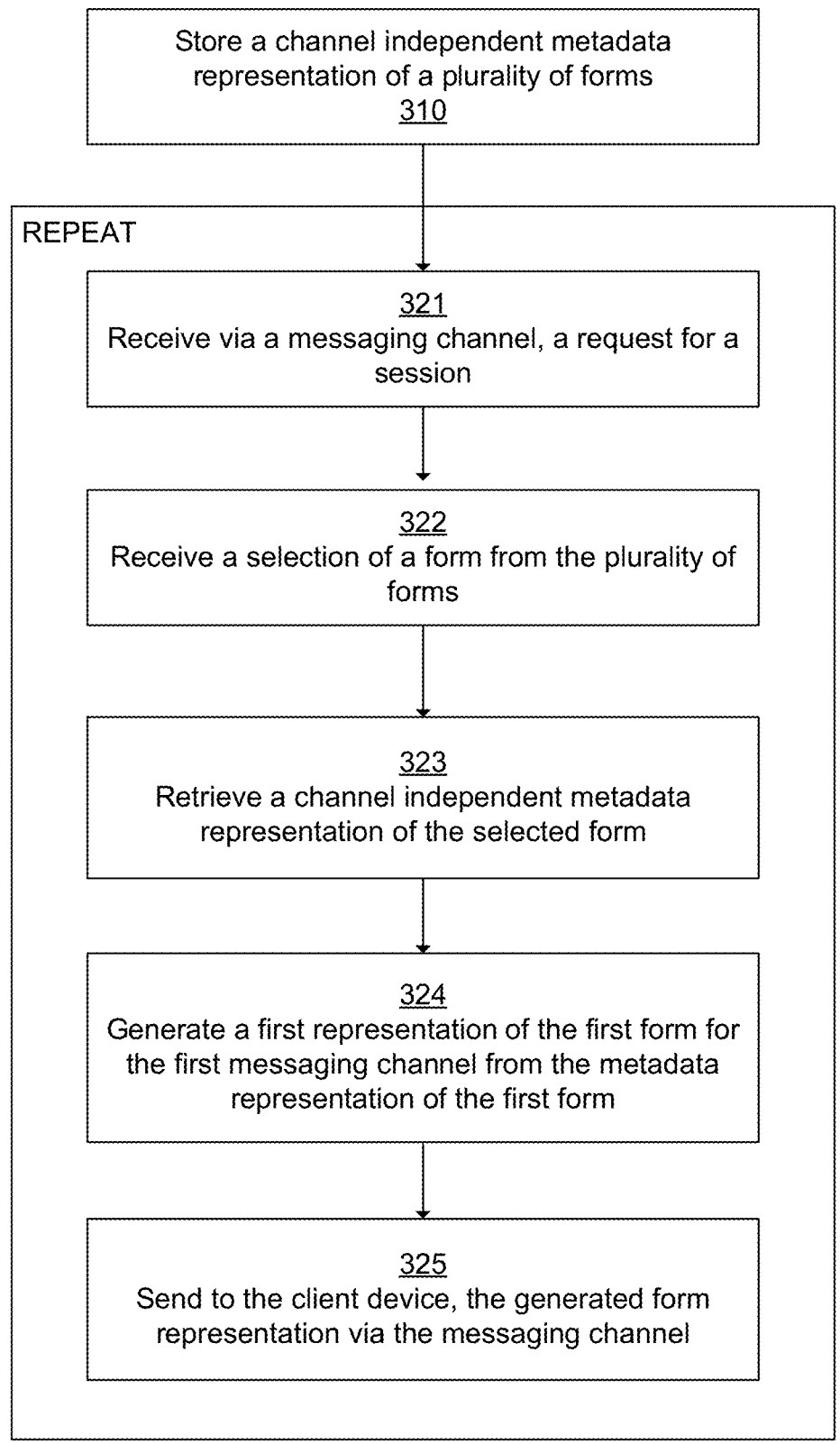
FIG. 3 is a flowchart illustrating a method for generating forms on messaging channels based on a channel independent representation of forms, in accordance with one or more embodiments.

FIG. 3 is a flowchart illustrating a method for generating forms on messaging channels based on a channel independent representation of forms, in accordance with one or more embodiments.

An online system stores 310 a channel independent metadata representation of each of a plurality of forms. The online system is configured to interact with client devices via a plurality of messaging channels, each messaging channel interacting with the online system via a different messaging application executing on a client device. In some embodiments, the channel independent metadata representation of each of the plurality of forms is stored in the metadata store of the online system.

The following steps 321, 322, 323, 324, and 325 are repeated. The online system receives a request for a session from a client device via a messaging channel. The request identifies the message channel. In addition to the request, a selection of the form from the plurality of forms is received 322 by the online system from the client device via a messaging channel. In some embodiments, the form generator of the online system receives the request and the form.

The online system retrieves 323 a channel independent metadata representation of the selected form. In some embodiments, the form generator of the online system retrieves the channel independent metadata representation of the selected form from the metadata store.

The online system generates 324 a first representation of the first form for the first messaging channel from the metadata representation of the first form. The first representation conforms to a format processed by the first messaging channel. In some embodiments, the form generator of the online system generates the first representation of the first form for the first metadata representation.

The generated form representation is sent 325 by the online system to the client device via the messaging channel. The generated form representation provides data allowing the client device to render a user interface of the messaging channel. The user interface comprises the selected form. Example user interfaces are described below with reference to FIGS. 4A-4B in detail.

Figure 4A:
FIGS. 4A-4B are screen shots illustrating user interfaces, in accordance with one or more embodiments.
Figure 4A:
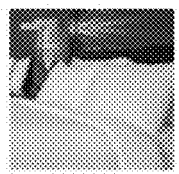
Figure 4A:
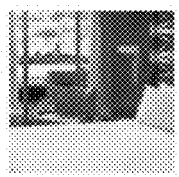
Figure 4A:
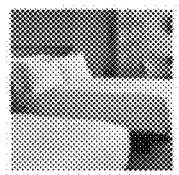
Figure 4A:
Figure 4B:
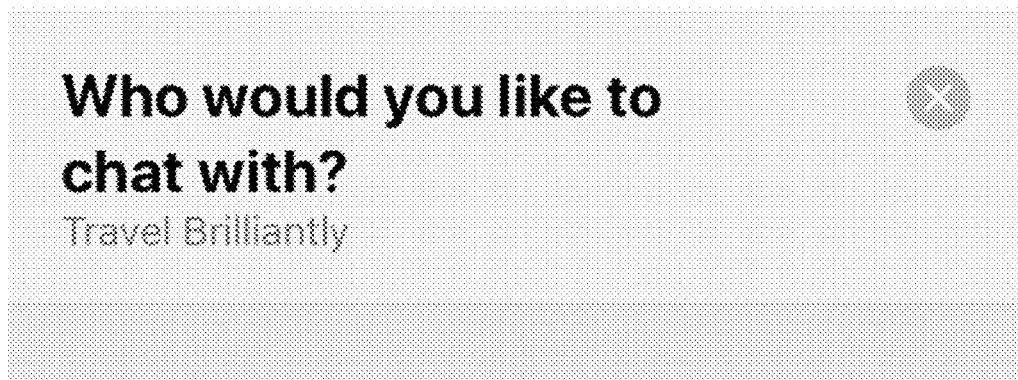

FIGS. 4A-4B are screen shots illustrating user interfaces, in accordance with one or more embodiments.

FIG. 4A is an exemplary form 400 for booking a hotel room. A customer support agent operating a second client device may request the online system to push the form 400 to a first client device via a messaging channel. In the embodiment of FIG. 4A, a widget of the form 400 displays available guest rooms and rates. The widget of the form 400 further displays pictures and text descriptions for each of the guest rooms. A user of the first client device may interact with the widget of the form 400 to book a guest room. For example, tactile gestures received via a touchscreen received by the first client device correspond to an interaction with the widget of the form 400 provided by the online system. Example tactile gestures received via a touchscreen interface include swiping, tapping, pressing, and contacting and holding pressure in an area on the touchscreen, as well as rotating the touchscreen or any other suitable user input for requesting content from the online system for presentation. The interaction of the user of the first client device may be sent to the second client device via the messaging channel associated with the first client device.

FIG. 4B is an exemplary form 450 for contacting a customer service representative. In some embodiments, a plurality of second client devices are connected to the online system. For example, in the embodiment of FIG. 4B, a user may interact with the form 450 to chat with Marriott Rewards, Starwood Reservations, Marriott Reservations, or Property Support.

Example forms are provided below for reference. In some embodiments, forms are represented in an XML format. Forms represented in an XML format resembling an HTML format may be less intimidating to non-developers. Including URL links to images allows the online system to avoid sending base64 embedded binaries until the form hits the gateway.

Example 1: An Event Form

Following is an example form that represents events using XML format. The form representation specifies a location for the events and details of the events including various time slots associated with the even identifying when the event occurred or is going to occur. Each time slot is specified using a timeslot tag that specifies a start time and a duration of the event. The form generator may obtain the various time slots for an event by executing a database query.

```
<?xml version="1.0" encoding="UTF-8"?>
<form type="event" id="" >
    <location lat="" long="" radius="" title="">
        <events title="" offset="">
            <timeslot id="11" startTime="" duration=""/>
            <timeslot id="12" startTime="" duration=""/>
        </events>
    <received>
    <message title="" subtitle="" style="small" img="" />
    </received>
    <reply >
        <message title="" subtitle="" style="small" img="" />
    </reply>
</form>
```

Example 2: A List Form

Following is an example form that represents lists using XML, format. The form comprises a list of two section tags. Each section may correspond to a record retrieved from a database using a database query. Each section itself may include multiple items that may be fetched from the database using the same database query or additional database queries. For example, each section may represent a hotel and each item may represent the types of rooms that are currently available in the hotel. Alternatively, the list may represent information describing flights based on a user provided criteria (e.g., specifying dates of travel, source and destination), where each section corresponds to an airline and each item represents a flight from that airline.

```xml
<?xml version="1.0" encoding="UTF-8"?>
<form type="list" mutliSelect="false" id="">
  <list>
    <section title="section 1" order="0">
      <item id="11" order="0" title="" subtitle="" style="small" img=""/>
      <item id="12" order="1" title="" subtitle="" style="small" img=""/>
      <item id="13" order="2" title="" subtitle="" style="small" img=""/>
    </section>
      <section title="section 2" order="1">
      <item id="21" order="0" title="" subtitle="" style="small" img=""/>
      <item id="22" order="1" title="" subtitle="" style="small" img=""/>
      <item id="23" order="2" title="" subtitle="" style="small" img=""/>
    </section>
  </list>
  <received>
      <message title="" subtitle="" style="small" img=""/>
  </received>
  <reply >
      <message title="" subtitle="" style="small" img=""/>
  </reply>
</form>
```

Example 3: Dynamic Form Definition with SQL Server

Following is an example of a form that specifies a database query for generating a list comprising sections. Each database query populates child items in the <section> XML elements with the <item> values from the database based on the query. As shown in the example below, the section titled "Available Shoes" is populated using the database query "select id, shoe as title, image as img from shoes where price<=:price." Similarly, the section titled "Shoe Colors" is populated using the database query "select id, color as title, colorimage as img from colors."

```xml
<?xml version="1.0" encoding="UTF-8"?>
<form type="list" mutliSelect="false" id="">
<database type="SQL" server="sql.example.com" name="exampledb" username="foo" password="bar"/>
   <list>
     <section title="Available Shoes" order="0" query="select id, shoe as title, image as img from shoes where price<=:price" style="small" />
     <section title="Shoe Colors" order="1" query="select id, color as title, colorimage as img from colors " style="small" />
   </list>
   <received>
       <message title="" subtitle="" style="small" img=""/>
   </received>
   <reply >
       <message title="" subtitle="" style="small" img=""/>
   </reply>
</form>
```

Example 4: Form Using XML Namespaces and Database Queries

Following is an example of a form that specifies different tags for different messaging channels. Accordingly the channel independent representation may be used to generate a form that uses messaging channel specific features that may not be supported by other channels. Accordingly the form specifies form elements using "facebook" prefix in tags as well as form elements using "apple" prefix in tags. The "facebook" tag represents the FACEBOOK MESSENGER messaging channel and the "apple" tag represents APPLE BUSINESS CHAT messaging channel.

```xml
<?xml version="1.0" encoding="UTF-8"?>
<form type="list" mutliSelect="false" id="" xmlns:apple="com:apple" xmlns:facebook ="com:facebook">
<database type="SQL" server="sql.example.com" name="exampledb" username="foo" password="bar"/>
<query id="shoeQuery" queryString="select id, shoe as title, image as img from shoes where price<=:price" style="small">
   <apple:list>
      <apple:section title="Available shoes" order="0" query="shoeQuery"/>
```

```
        </apple:list>
        <facebook:template type="button" >
            <facebook:button type="web_url" message="Available shoes" query="shoeQuery" />
        </facebook:template>
        <apple:received>
            <apple:message title="" subtitle="" style="small" img=""/>
        </apple:received>
        <apple:reply >
            <apple:message title="" subtitle="" style="small" img=""/>
        </apple:reply>
</form>
```

Computer Architecture

Figure 5:
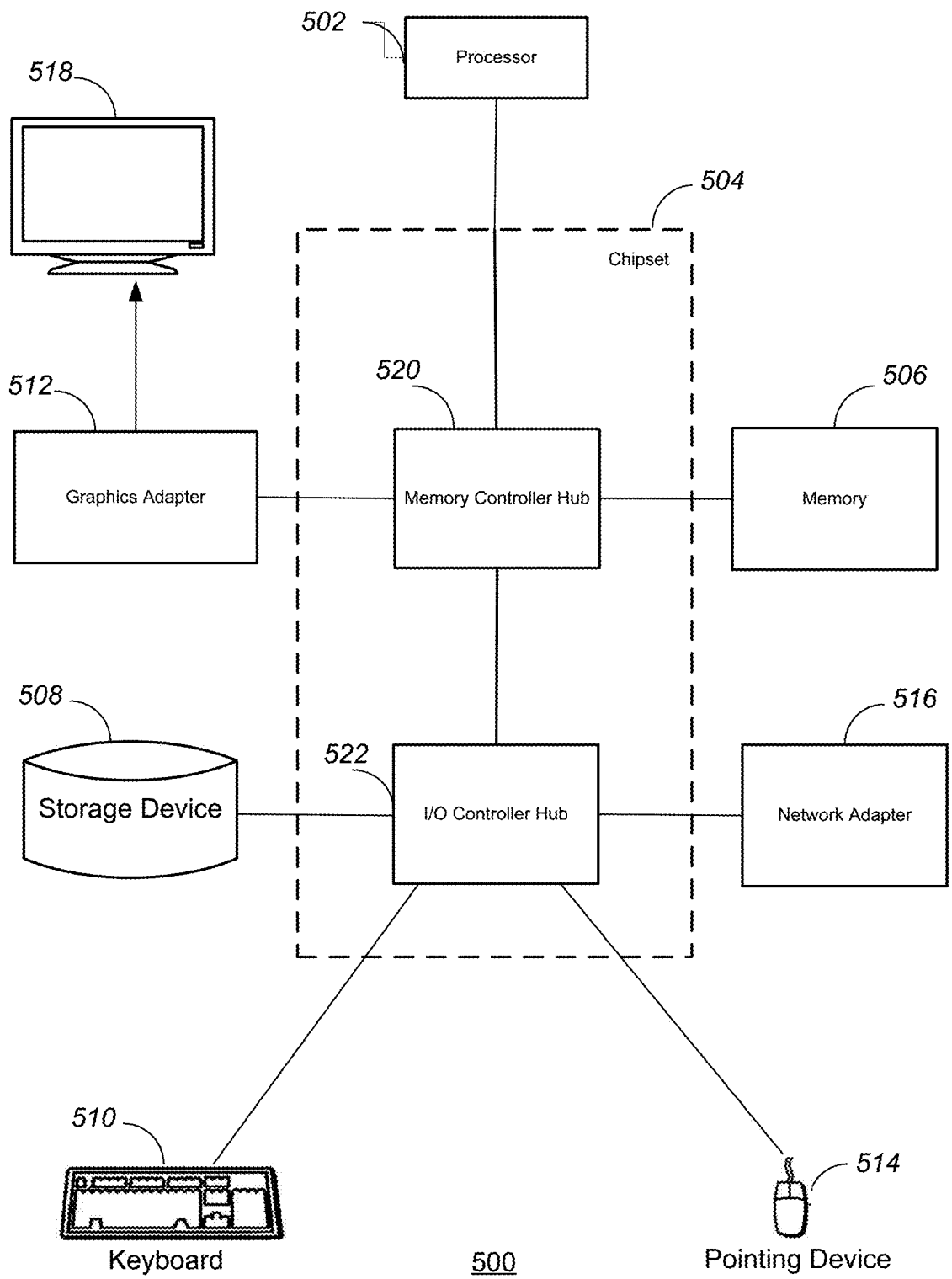
FIG. 5 is a high-level block diagram illustrating an example computer for implementing the client device and/or the online system 110, according to an embodiment.

FIG. 5 is a high-level block diagram illustrating an example computer for implementing the client device and/or the online system 110, according to an embodiment. The computer 500 includes at least one processor 502 coupled to a chipset 504. The chipset 504 includes a memory controller hub 520 and an input/output (I/O) controller hub 522. A memory 506 and a graphics adapter 512 are coupled to the memory controller hub 520, and a display 518 is coupled to the graphics adapter 512. A storage device 508, an input device 514, and network adapter 516 are coupled to the I/O controller hub 522. Other embodiments of the computer 500 have different architectures.

The storage device 508 is a non-transitory computer-readable storage medium such as a hard drive, compact disk read-only memory (CD-ROM), DVD, or a solid-state memory device. The memory 506 holds instructions and data used by the processor 502. The input interface 514 is a touch-screen interface, a mouse, track ball, or other type of pointing device, a keyboard 510, or some combination thereof, and is used to input data into the computer 500. In some embodiments, the computer 500 may be configured to receive input (e.g., commands) from the input interface 514 via gestures from the user. The graphics adapter 512 displays images and other information on the display 518. The network adapter 516 couples the computer 500 to one or more computer networks.

The computer 500 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 508, loaded into the memory 506, and executed by the processor 502.

The types of computers 500 used by the entities of FIG. 1 can vary depending upon the embodiment and the processing power required by the entity. The computers 500 can lack some of the components described above, such as graphics adapters 512, and displays 518. For example, the online system 110 can be formed of multiple blade servers communicating through a network such as in a server farm.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   storing, by an online system, a channel independent metadata representation of each of a plurality of forms, wherein the online system is configured to interact with client devices via a plurality of messaging channels, each messaging channel interacting with the online system via a different messaging application; and repeating the steps comprising:
receiving, by the online system, a first request for a first session from a first client device via a first messaging application, the first request identifying the first messaging application, and a second request for a second session, the second request from a second client device via a second messaging application, the second request identifying the second messaging application;
receiving, by the online system, a selection of a form from the plurality of forms from the first client device via the first messaging application;
receiving, by the online system, a selection of the form from the plurality of forms from the second client device via the second messaging application;
retrieving, by the online system, a channel independent metadata representation of the selected form;
generating, by the online system, a first representation of the selected form for the first messaging application from the channel independent metadata representation of the selected form, wherein the first representation conforms to a format corresponding to the first messaging application, and a second representation of the selected form for the second messaging application from the channel independent metadata representation of the form, wherein the second representation conforms to a format corresponding to the second messaging application; and
sending, by the online system, the first generated representation of the selected form to the first client device via the first messaging application, and the second generated representation of the selected form to the second client device via the second messaging application.

2. The method of claim 1, wherein the selected form is a first form, the method further comprising:
receiving, from the first client device, a first user interaction with a widget of the first generated representation of the first form;
identifying a second form based on the first user interaction;
selecting a channel independent metadata representation of the second form; and
generating, from the metadata representation of the second form, a second form representation of the second form for the first messaging application.

3. The method of claim 1, wherein the selection of the form is received from a third client device that requests the online system to push the selected form to the first client device via the first messaging application.

4. The method of claim 1, wherein the channel independent metadata representation of the form specifies a database query, wherein the online system generates the first representation of the selected form based on a result of the database query.

5. The method of claim 4, wherein the database query returns a set of records and the first generated representation of the selected form comprises a widget presenting data returned by the database query.

6. The method of claim 1, wherein responsive to receiving a user interaction associated with a widget of the selected form, storing by the online system, a log identifying the selected form and a metadata tag in the channel independent metadata representation, the metadata tag corresponding to the widget.

7. The method of claim 6, further comprising:
receiving a criteria for generating a report describing user interactions across a plurality of messaging applications;
selecting a plurality of past user interactions from the log wherein the selected user interactions satisfy the criteria, the selected user interactions comprising user interactions performed using the plurality of messaging applications; and
generating the report based on the plurality of past user interactions.

8. A non-transitory computer readable storage medium having instructions encoded thereon that, when executed by a processor, cause the processor to:
store, by an online system, a channel independent metadata representation of each of a plurality of forms, wherein the online system is configured to interact with client devices via a plurality of messaging channels, each messaging channel interacting with the online system via a different messaging application; and
repeat the steps comprising:
receive, by the online system, a first request for a first session from a first client device via a first messaging application, the first request identifying the first messaging application, and a second request for a second session, the second request from a second client device via a second messaging application, the second request identifying the second messaging application;
receive, by the online system, a selection of a form from the plurality of forms from the first client device via the first messaging application;
receive, by the online system, a selection of the form from the plurality of forms from the second client device via the second messaging application;
retrieve, by the online system, a channel independent metadata representation of the selected form;
generate, by the online system, a first representation of the selected form for the first messaging application from the channel independent metadata representation of the selected form, wherein the first representation conforms to a format corresponding to the first messaging application, and a second representation of the selected form for the second messaging application from the channel independent metadata representation of the selected form, wherein the second representation conforms to a format corresponding to the second messaging application; and
send, by the online system, the first generated representation of the selected form to the first client device via the messaging application, and the second generated representation of the selected form to the second client device via the second messaging application.

9. The non-transitory computer readable storage medium of claim 8, wherein the selected form is a first form the computer readable storage medium further has instructions encoded thereon that, when executed by the processor, cause the processor to:
receive, from the first client device, a first user interaction with a widget of the first generated representation of the selected form;
identify a second form based on the first user interaction;

select a channel independent metadata representation of the second form; and generate, from the metadata representation of the second form, a form representation of the second form for the first messaging application.

10. The non-transitory computer readable storage medium of claim 8, wherein the selection of the form is received from a third client device that requests the online system to push the selected form to the first client device via the first messaging application.

11. The non-transitory computer readable storage medium of claim 8, wherein the channel independent metadata representation of the form specifies a database query, wherein the online system generates the first representation of the selected form based on a result of the database query.

12. The non-transitory computer readable storage medium of claim 11, wherein the database query returns a set of records and the generated first representation of the selected form comprises a widget presenting data returned by the database query.

13. The non-transitory computer readable storage medium of claim 8, wherein responsive to receiving a user interaction associated with a widget of the form, storing by the online system, a log identifying the form and a metadata tag in the channel independent metadata representation, the metadata tag corresponding to the widget.

14. The non-transitory computer readable storage medium of claim 13, wherein the computer readable storage medium further has instructions encoded thereon that, when executed by the processor, cause the processor to:

receive criteria for generating a report describing user interactions across a plurality of messaging applications;

select a plurality of past user interactions from the log wherein the selected user interactions satisfy the criteria, the selected user interactions comprising user interactions performed using the plurality of messaging applications; and generate the report based on the plurality of past user interactions.

15. A computer system comprising:

a metadata store configured to store a channel independent metadata representation of each of a plurality of forms;

a form generator configured to repeat the steps comprising:

receive a first request for a first session from a first client device via a first messaging application, the first request identifying the first messaging, application, and a second request for a second session, the second request from a second client device via a second messaging application, the second request identifying the second messaging application;

receive a selection of a form from the plurality of forms from the first client device via the first messaging application, receive a selection of the form from the plurality of forms from the second client device via the second messaging application, retrieve a channel independent metadata representation of the selected form, and generate a first representation of the selected form for the first messaging application from the channel independent metadata representation of the selected form, wherein the first representation conforms to a format corresponding to the first messaging application, and a second representation of the selected form for the second messaging application from the channel independent metadata representation of the selected form, wherein the second representation conforms to a format corresponding the second messaging application; and a channel interface configured to send the first generated representation of the selected form via the first messaging application and the second generated representation of the selected form via the second messaging application.

16. The computer system of claim 15, wherein the selection of the form is received from a third client device that requests the form generator to push the selected form to the first client device via the first messaging application.

17. The computer system of claim 15, wherein the channel independent metadata representation of the form specifies a database query, wherein the form generator generates the first representation of the selected form based on a result of the database query.

18. The computer system of claim 15, wherein the database query returns a set of records and the first generated representation of the selected form comprises a widget presenting data returned by the database query.

19. The computer system of claim 15, further comprising an action log configured to store a log identifying the form and a metadata tag in the channel independent metadata representation responsive to receiving a user interaction associated with a widget of a form, the metadata tag corresponding to the widget.

20. The computer system of claim 19, further comprising a report generator configured to receive criteria for generating a report describing user interactions across a plurality of messaging application, select a plurality of past user interactions from the log, wherein the selected user interactions satisfy the criteria, the selected user interactions comprising user interactions performed using the plurality of messaging applications, and generate the report based on the plurality of past user interactions.

* * * * *